June 1, 1937. W. W. SLOANE 2,082,361
DRIVE MECHANISM FOR SHAKER CONVEYERS
Original Filed Feb. 26, 1934   3 Sheets-Sheet 1

Inventor
William W. Sloane
Clarence J. Poole
Attorney

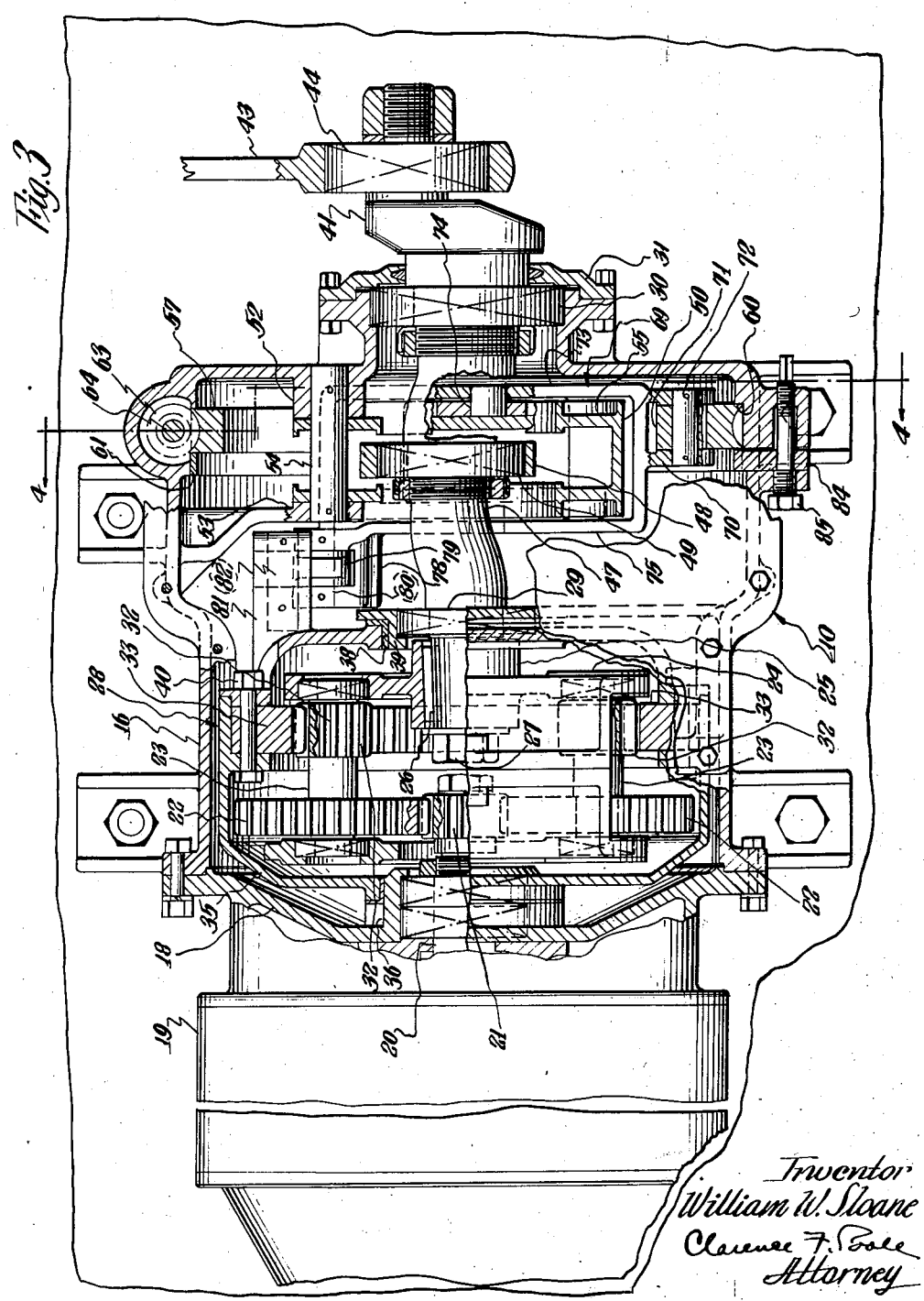

Inventor
William W. Sloane
Clarence F. Poole
Attorney

Patented June 1, 1937

2,082,361

UNITED STATES PATENT OFFICE 2,082,361

DRIVE MECHANISM FOR SHAKER CONVEYERS

William W. Sloane, Chicago, Ill., assignor to Goodman Manufacturing Company, Chicago, Ill., a corporation of Illinois Application February 26, 1934, Serial No. 712,969
Renewed September 30, 1936

22 Claims. (Cl. 198—220)

This invention relates to improvements in drive mechanisms for shaker conveyers of the type utilized for conveying loose material, such as coal.

My invention has as one of its objects to provide a new and improved mechanical movement for a drive of the character described whereby an infinite number of conveying actions may be obtained for conveying material along a conveyer trough or pan line. Another object of my invention is to provide a drive which is so arranged that the direction of movement of material along the conveyer trough or pan line may be reversed under control of the operator.

Heretofore, shaker conveyer drives have been so constructed that material is moved along the pan line in one direction only. In order to reverse the direction of movement of material along the pan line an additional drive must be provided or the position of the drive with respect to the pan line must be reversed. A reversible drive is particularly advantageous where the length of the pan line is frequently increased in cases where material is loaded from the face by means of a shovel on the end of the pan line, especially where the coal seam is of a low vertical height. In such instances it is desirable to reverse the direction of the conveying action of the pan line in order that additional conveyer troughs and supplies may be transported up to the working face to avoid the necessity of transporting these troughs or supplies to the working face by hand.

A prior application, filed by me on January 15, 1934, bearing Serial No. 706,787, and now Patent No. 2,077,811 which issued April 20, 1937, discloses a drive mechanism operating on principles similar to those of my present invention. The device of my present invention, however, is so arranged that the pan line may be driven in such a manner as to convey material therealong at an infinite number of speeds and in either direction under control of the operator.

Other objects of my invention will appear from time to time as the following specification proceeds.

My invention may be more clearly understood with reference to the accompanying drawings wherein:

Figure 3 is an enlarged plan view of the drive mechanism with a portion of the gear cover removed and with parts broken away and shown in horizontal section to more clearly illustrate the details thereof;

Figure 1:
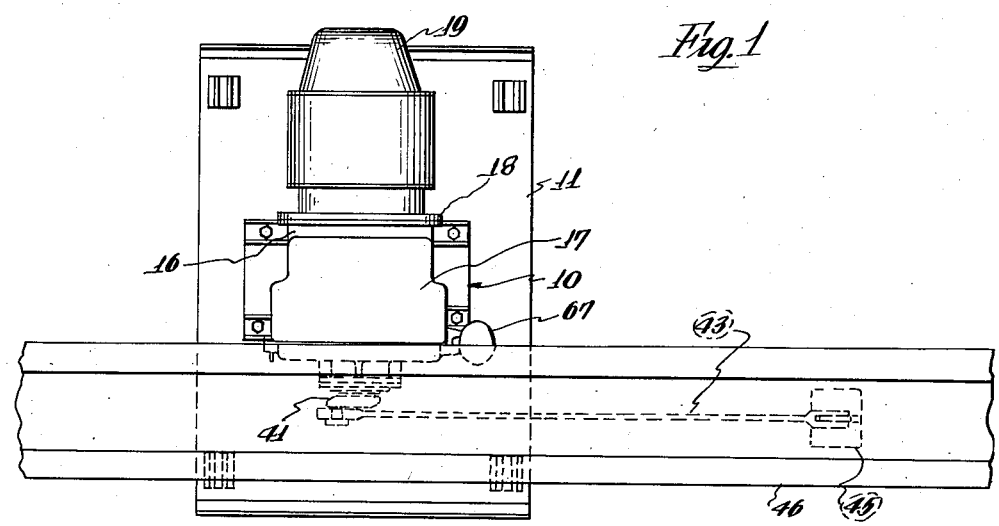
Figure 1 is a top plan view showing a device constructed in accordance with my invention operatively connected with a section of conveyer troughing.
Figure 2:
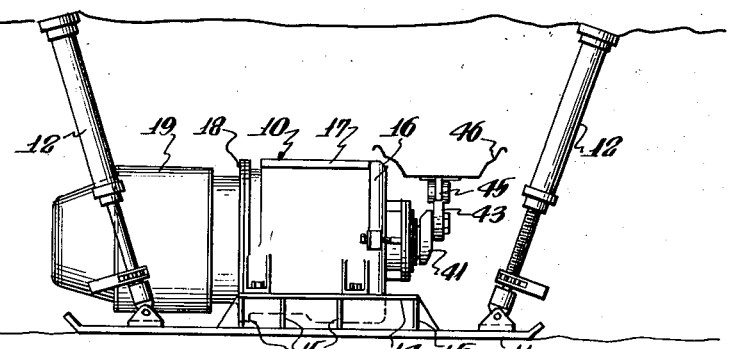
Figure 2 is a side elevation of the device shown in Figure 1.

Referring now in particular to the drawings illustrating one embodiment of my invention, a shaker conveyer drive mechanism is generally indicated by reference character 10. Said drive mechanism is shown as being mounted on a base plate 11, which may be of a more or less non-rigid character to conform to a mine bottom which is slightly uneven. The base plate 11 is provided with upturned ends for movement along the ground and is adapted to be held in position on the bottom by means of a plurality of adjustable screw jacks 12, 12 in the usual manner, one of said jacks being disposed adjacent each corner of said base plate.

A supporting framework for the drive mechanism 10 is provided on the base plate 11, herein including a pair of parallel spaced angles 14, 14 mounted on and secured to the base plate 11 on their vertical legs in such a manner that their horizontal legs are spaced above the base plate 11 and extend outwardly from the center thereof. The angles 14, 14 are herein shown as being welded to the base plate 11 and braced by means of suitable members 15, 15. A casing 16 is secured to the horizontal legs of the angles 14, 14 by means of suitable nuts and bolts in a usual manner. The casing 16 is of an oil-tight construction and forms a housing and bearing support means for the operating parts of the conveyer drive mechanism. A removable cover 17 is secured thereto in a suitable manner. One end of the casing 16 abuts and is enclosed by an end plate 18 of a motor 19, which motor is herein shown as being an electric motor of standard construction.

The motor 19 is provided with an armature shaft 20 journaled adjacent one of its ends in the end plate 18, said armature shaft having a pinion 21 keyed thereto which acts as a sun pinion for a planetary geared reduction device 28. The pinion 21 meshes with and drives planetary gears 22, 22 carried on parallel spaced shafts 23, 23, which shafts are journaled adjacent their ends in a cage 24. The cage 24 is provided with a hub 25, keyed to an inner end of a shaft 26 and held in fixed relation with respect thereto by means of a suitable nut and washer, indicated by reference character 27. The shaft 26 is journaled adjacent the hub 25 of the cage 24 in a suitable anti-friction bearing member 29 carried in a suitable bearing support means herein formed integral with the casing 16. A suitable anti-friction bearing member 30 carried in the outer end of the casing 16 and held therein by a removable end plate 31 forms a bearing for the opposite end of the shaft 26.

Planetary pinions 32, 32 are keyed on the shafts 23, 23 and spaced from the planetary gears 22, 22 and mesh with an internal ring gear 33. The internal ring gear 33 serves as a reaction member for the planetary geared reduction device and its outer periphery and side adjacent the motor 19 abuts a shouldered portion of a rotatable support member 35, which support member extends over the planetary gears 22, 22, and is journaled on a hub 36 formed integral with the end plate 18 of the motor 19. A spider 37 abuts the opposite face of the internal gear 33 and is journaled on its hub in a suitable bearing member 38 carried on a shoulder 39 formed on a portion of the outer side of the support member for the bearing 29. The support member 35 and spider 37 are secured to each other, and to the internal ring 33 by means of suitable nuts and bolts 40, 40 so that all of said last-named parts may rotate as a unit.

It will be apparent that rotation of the sun pinion 21 will rotate the cage 24 within the internal gear 33 when said internal gear is held from movement. When the internal gear 33 is free to rotate in the direction of rotation of the cage 24, the speed of rotation of said cage will be increased, but when the internal gear 33 is rotated in an opposite direction, the speed of rotation of said cage will be decreased.

The outer end of the shaft 26 extends beyond the bearing 30 and is provided with a crank 41, herein shown as being formed integral with said shaft. The crank 41 has a pusher rod or pitman 43 journaled thereon by means of a suitable bearing member 44. The free end of said pusher rod is pivotally connected to a connecting member 45, secured to and depending from a conveyer trough 46 for reciprocably moving said conveyer trough upon rotation of the crank 41.

Referring now in particular to the means for varying the angular velocity of the crank 41 during each revolution thereof for imparting a rectilinear motion to the conveyor trough 46 having predetermined changes in acceleration during various parts of the forward stroke for moving material therealong, means are provided for rocking the internal gear 33 alternately in opposite directions during each revolution of the crank 41, and thus varying the angular velocity of said crank during each revolution thereof in a manner similar to that set forth in my aforementioned prior application. Said means, as herein shown, includes a crank 47 formed integrally with the shaft 26 intermediate the bearings 29 and 30. Said crank is so located with respect to the crank 41 that its dead center position is 90° out of phase with the dead center position of the crank 41 in a manner similar to that described in my aforementioned prior application. A connecting member 48 is journaled on the crank 47 by means of a suitable anti-friction bearing 49 in a usual manner and is pivotally connected with an annular rocking member 50 by means of a pivotal pin 51. The annular rocking member 50 encircles the crank 47 on opposite sides of the bearing 49 and is pivotally connected between a fixed lug 52 and projection 53 of the casing 16 by means of a pin 54 secured at its ends in said fixed lug and projection, said annular member abutting the inner sides of said projection and lug. A segmental annular guide 55 is formed in the outer face of the annular member 50 and is adapted to form a guide for a member 56.

A worm ring gear 57 encircles the shaft 26 and annular member 50 and is carried within the casing 16 for rotatable movement with respect thereto. Said gear ring abuts a shouldered portion 60 formed in the casing 16 adjacent its end opposite the motor 19. A retaining ring 61 abuts the opposite side of said ring. Said retaining ring is herein shown as being secured to the casing 16 by means of suitable cap screws 62, 62.

A worm 63, herein shown as being formed integral with a shaft 64, meshes with the worm ring gear 57. Said shaft is journaled adjacent its lower end in the casing 16 and adjacent the upper end of the worm 63 in a threaded member 66, threaded within said casing. A hand wheel 67 is provided on the upper end of the shaft 64 for rotating said shaft and rotatably moving the worm ring gear 57 with respect to the casing 16.

A rocking member or arm 69 is provided with a bifurcated portion 70 adjacent one of its ends, the insides of the prongs of which bifurcated portion abut opposite sides of a projection 71 extending inwardly from the inner periphery of the ring gear 57. The bifurcated portion 70 of said rocking arm is pivotally connected to the projection 71 by means of a pivotal pin 72 (see Figure 3). An arm 73 of said rocking arm extends from the bifurcated portion 70 along the outer side of the annular rocking member 50 and is pivotally connected with the member 56 by means of a pivotal pin 74. Another arm 75 of said rocking arm is spaced from and extends parallel to the arm 73. The outer end of the arm 73 is connected to the arm 75 by means of an integral arcuately formed web 77 so arranged as to clear the annular rocking member 50 in all positions of said rocking arm with respect to said rocking member, as is clearly shown in Figures 4 and 5. An integral forked portion 78 of the arm 75 extends inwardly therefrom adjacent the outer end thereof and has a connecting link 79 pivotally connected thereto between the prongs of said forked portion by means of a pivotal pin 80. An integral forked projection 81 extends outwardly from the spider 37 and forms a pivotal connection for the link 79 by means of a pivotal pin 82.

It is thus apparent that upon rotation of the shaft 26, the crank 47 will rock the annular member 50 about the axis of the pin 54 and that such rocking movement of said annular rocking member will pivot the rocking arm 69 about its pivot on the worm ring gear 57, provided said rocking arm is properly positioned with respect to said annular rocking member. Rocking movement of the rocking arm 69 will rock the internal gear 33 in opposite directions during each revolution of the shaft 26 in an obvious manner.

Figure 6:
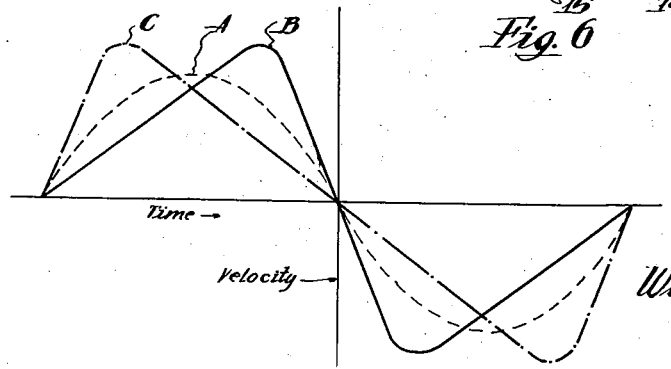
Figure 6 is a diagrammatic view showing certain hypothetical velocity curves of shaker motions for conveying material along the pan line in opposite directions.

It should be understood that when the reaction member or internal gear 33 is held from movement that the crank 41 is rotated in such a manner that the velocity curve of the conveyer trough 46 is substantially a sine curve, as is indicated by curve A in Figure 6. Such an action will not move material along the trough 46 when the latter is level, for the reason that the acceleration and deceleration of said trough is the same for both ends of the forward and return strokes. As the internal gear 33 is reciprocably rocked, as herein described, during each revolution of the crank 41, the acceleration and deceleration of the forward stroke of the trough 46 become unequal. The greater the arc of movement of the internal gear 33 during each revolution of the crank 41, the steeper will be the line indicating the deceleration of the forward stroke, resulting in a greater increase in coal travel, as well as greater stress on the drive mechanism.

Figure 4:
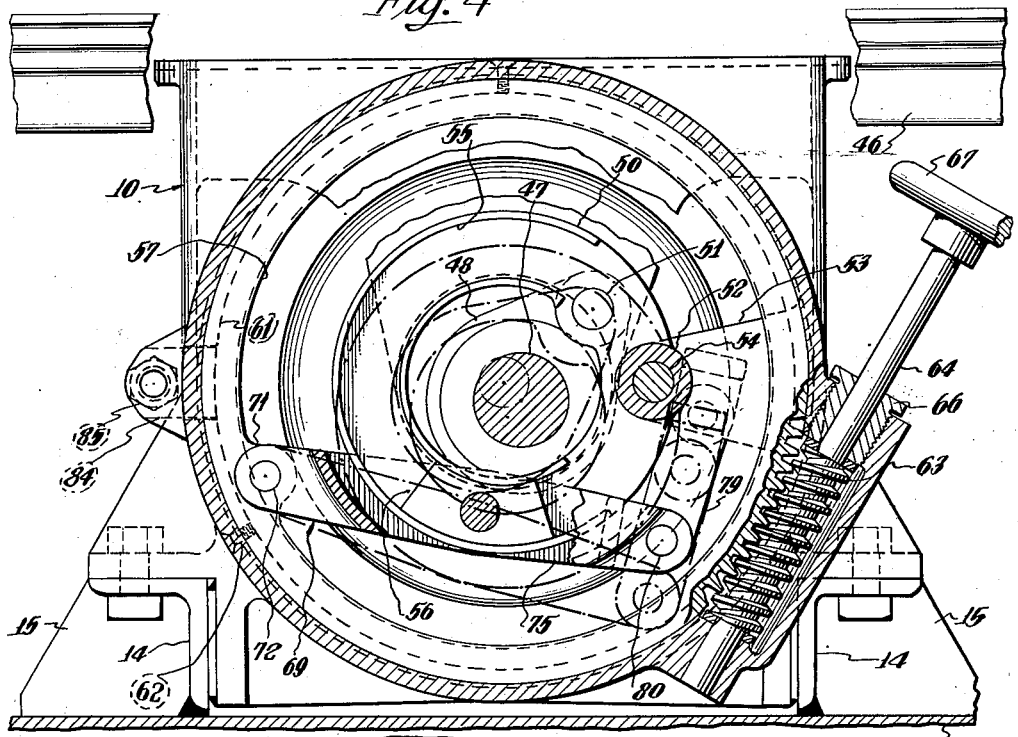
Figure 4 is a sectional view taken substantially along line 4—4 of Figure 3.
Figure 5:
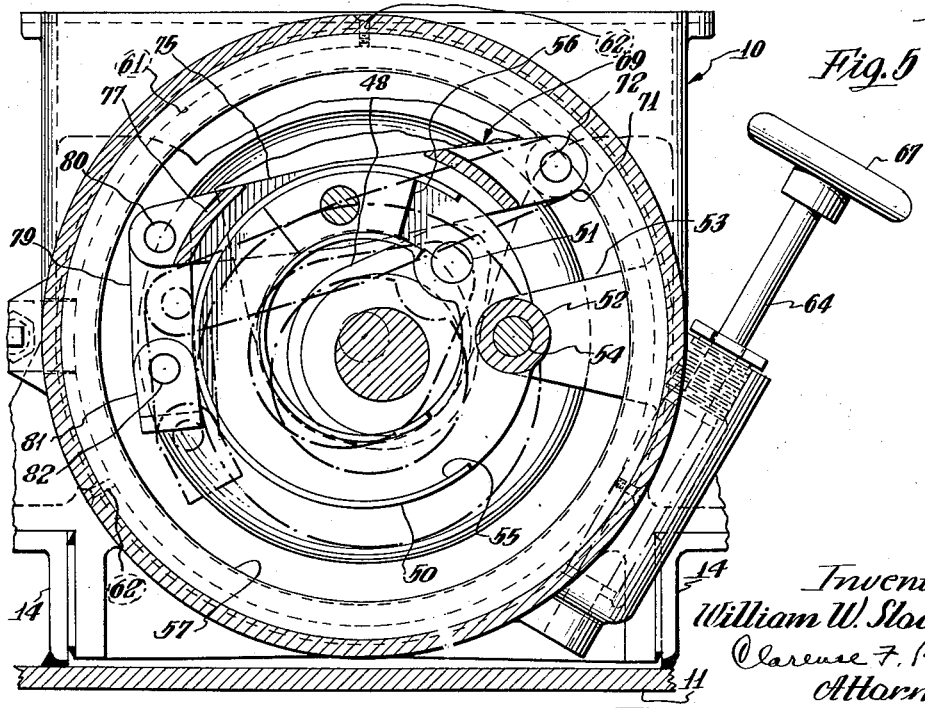
Figure 5 is a sectional view taken in substantially the same plane as in Figure 4, but with the mechanism arranged to reverse the direction of movement of material along the trough or pan line.

Referring now in particular to Figures 4, 5, and 6, it may be seen that when the worm gear 57 is rotated in a counter-clockwise direction so that the member 56 approaches the pin 54, rocking movement of the rocking arm 69 is increased, which in turn increases the arc of movement of the internal gear 33, and also increases the violence of the conveying action. As shown in Figure 4, the position of the rocking arm 69 with respect to the annular rocking member 50 is such that the acceleration curve of the trough 46 is similar to that indicated by curve B in Figure 6, and said trough, when so driven, will convey material therealong in a direction from left to right, as seen in Figure 1.

Movement of the worm gear 57 in a clockwise direction from the position shown in Figure 4, results in a decrease in movement of the rocking arm 69 and internal gear 33 until a point is reached where there will be no appreciable movement of said reaction member. The velocity curve of the trough 46 will then be a sine curve and no movement of material will result, as has hereinbefore been explained. It is thus apparent that an infinite number of variations in the conveying action may be obtained for moving material along the trough 46 in one direction, merely by rotating the worm 57 during operating of the device. Thus, as the length of the pan line increases, the drive may be so adjusted that the safe stress on the drive mechanism will remain the same as for a short pan line. Also the violence of the drive may be increased for conveying material up grade or decreased for conveying material down grade.

Further movement of the worm gear 57 in a clockwise direction causes the reaction member, or internal gear 33, to be rocked in a direction opposite to that previously described, in which the peak of the acceleration curve occurs in the first 90° of the cycle of rotation of the crank 41. As has before been explained, an increase in reciprocable movement of the internal gear 33 during each revolution of the crank 41 will increase the height of the peak of the acceleration curve, and the rate of reversal of the pan line at the end of the stroke. The result is that when the peak of the acceleration curve occurs in the first 90° of the cycle of rotation of the crank 41, the direction of movement of material along the pan line will be reversed, due to the fact that the peak of the acceleration curve is on the opposite side of the peak of the sine curve from the peak of curve B, as is illustrated by curve C in Figure 6.

It may thus be seen that the direction of movement of material along the pan line 46 may be reversed by first diminishing the corrective effect of the crank 41 until the acceleration curve of said crank is substantially a sine curve, and then increasing the corrective effect of said crank during the first 90° of rotation of said crank. Thus, an infinite number of variations in conveying actions for conveying material along the pan line in either direction may readily be obtained in a simple manner, and these variations can be obtained while the conveying mechanism is in operation.

The worm 63 and ring worm gear 57 are preferably of the self-locking type; that is, the pitch of said gears is such that said worm gear cannot rotate said worm. In view of the fact that vibration of the parts is liable to cause a certain amount of movement of the worm 63 and ring worm gear 57, suitable additional locking means may be provided for more positively holding the worm 63 and worm gear 59 from undesired rotation. Said locking means may be of any type, but is herein shown as being a locking member 84 carried in a suitable slot formed in the casing 16 and retaining ring 61. The locking member 84 is carried by a threaded member 85 and its face opposite the worm gear 59 is abutted by a shouldered portion of said threaded member. The inner end of the locking member 84 is adapted to abut the inner face of the ring 57 in such a manner that rotation of the threaded member 85 will clamp said member against said ring and hold said ring and the worm gear 57 from rotation. The outer end of the threaded member 85 is squared so that a suitable key or crank may be inserted thereon for rotating said threaded member.

Suitable means may be provided to indicate when the drive is positioned to convey material in a reverse or forward direction and to indicate the violence of the drive motion in order that the type of motion driving the pan line may readily be determined. Said means may be of any type well known to those skilled in the art, but is not herein shown or described since it is no portion of my present invention.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. In a shaker conveyer operating mechanism and in combination with a reciprocably driven conveyer trough, a rotatably driven crank, a drive connection from said crank to said conveyer trough, and means for driving said crank at a variable angular velocity comprising a gear, a member rotatably driven thereby, a reaction member having operative connection with said driven member and a drive connection from said driven member to said crank, an angularly movable member having connection with said reaction member for moving said reaction member in opposite directions during each revolution of said crank and varying the angular velocity of said crank, and means for reversing the order of acceleration and deceleration of said crank for moving material along said trough in a reverse direction comprising means for reversing the direction of movement of said angularly movable member.

2. In a shaker conveyer drive, a drive shaft, a driven shaft having a crank thereon, planetary drive gearing for rotating said crank with alternating acceleration and deceleration during each revolution thereof including a reciprocably movable reaction member, and means for reciprocably moving said reaction member during each revolution of said crank including an oscillating member, an eccentric driven in timed relation with said crank and operatively connected to said oscillating member, and a rocking member fulcrumed adjacent one of its ends, pivotally connected to said oscillating member intermediate its ends, and pivotally connected to said reaction member adjacent its opposite end, the fulcrum point of said rocking member being connected to a gear adapted to form a means for adjusting the fulcrum point of said rocking member and reversing the conveying action of said drive.

3. In a shaker conveyer drive, a drive shaft, a driven shaft having a crank thereon, planetary drive gearing for rotating said crank with alternating acceleration and deceleration during each revolution thereof including a reciprocably movable reaction member and means for reciprocably moving said reaction member during each revolution of said crank including an oscillating member, an eccentric reciprocably mounted relative to said crank and driven in timed relation with said crank and operatively connected to said oscillating member, a rocking member fulcrumed adjacent one of its ends, pivotally connected to said oscillating member intermediate its ends and pivotally connected to said reaction member adjacent its opposite end, and means for shifting the fulcrum point of said rocking member in an arc coaxial with the axis of said reaction member to reverse the order of acceleration and deceleration of said driven crank.

4. A shaker conveyer drive in accordance with claim 3, wherein said rocking member has slidable connection with said oscillating member and is fulcrumed to a rotatable member disposed coaxial with the axis of said reaction member.

5. In a reciprocating drive mechanism of the class described, a drive shaft, a driven shaft having a crank thereon, a planetary drive gearing for rotating said shaft with a variable angular velocity during each revolution thereof including a reaction member, means driven at a variable angular velocity for varying the angular velocity of said crank comprising means for reciprocably moving said reaction member during each revolution of said crank including a rocking member movable about a fixed fulcrum adjacent one of its ends, a drive connection from said driven shaft to said rocking member, a connection from the opposite end of said rocking member to said reaction member and means controllable at will for shifting the fulcrum point of said rocking member in such a manner as to change the stroke of said rocking member and reverse the order of acceleration and deceleration of said driven crank.

6. In a shaker conveyer drive, a reciprocably driven member including a conveyer trough, a rotatable crank, a connection between said crank and trough, means for rotating said crank and reciprocably driving said trough in such a manner as to convey material therealong in one direction comprising a planetary geared reduction device including a movable reaction member, and means for pivotally moving said reaction member in opposite directions during each revolution of said crank for changing the rate of acceleration of said crank during each revolution thereof and producing a maximum rate of acceleration during the second 90° of the cycle of rotation thereof comprising another crank coaxial with said first crank and a member rocked thereby having operative connection with said reaction member, and means for reversing the direction of travel of material along said trough comprising means for shifting the pivotal axis of said rocking member and thereby shifting the point of maximum acceleration of said crank so as to occur in the first 90° of the cycle of rotation thereof.

7. In a shaker conveyer drive, a reciprocably driven member, a conveyer trough driven thereby in such a manner as to move material therealong, a rotatable crank, a connection between said crank and reciprocably driven member, means for rotating said crank in such a manner that its maximum acceleration may occur in the latter portion of the forward stroke of said reciprocably driven member comprising planetary drive gearing including a reaction member comprising an internal gear, means for moving said reaction member in opposite directions during each revolution of said crank including a rocking arm movable about a pivotal axis fixed with respect to said reaction member, a crank, a connection between said crank and rocking arm and a connection between said rocking arm and reaction member, and means for reversing the direction of movement of material along said trough comprising means for shifting the axis of pivotal movement of said rocking arm in such a manner as to so shift the point of maximum acceleration of said crank that it may occur in the first part of the forward stroke of said reciprocably driven member.

8. A shaker conveyer drive in accordance with claim 7 wherein the means for shifting the axis of pivotal movement of said rocking arm comprises a rotatable member to which said rocking arm is pivotally connected and means for rotating said rotatable member or holding said rotatable member from movement.

9. In a shaker conveyer drive, a reciprocably driven member, a conveyer trough driven thereby in such a manner as to move material therealong, a rotatable crank, a connection between said crank and reciprocably driven member, means for rotating said crank in such a manner that its maximum acceleration is in the latter portion of the forward stroke of said reciprocably driven member comprising a planetary geared reduction device including a reciprocably movable reaction member comprising an internal gear, means for moving said internal gear in opposite directions during each revolution of said crank including a crank driven by the means for rotating said last-mentioned crank and a rocking arm rocked by said crank and connected with said internal gear, and means for shifting the point of maximum acceleration of said reciprocable driven member from the latter portion of the forward stroke to the central portion of the forward stroke for gradually diminishing the conveying action of said conveyer trough and thence to the first portion of the first half of the forward stroke comprising means for shifting the axis of pivotal movement of said rocking arm including a shiftable member to which said rocking arm is pivotally connected and means for shifting said shiftable member or holding it from movement.

10. In a reciprocating drive mechanism of the class described, a drive shaft, a driven shaft having a crank thereon, planetary drive gearing for rotating said shaft with a variable angular velocity during each revolution thereof including a reaction member, means driven at a variable angular velocity for varying the angular velocity of said crank comprising means for reciprocably moving said reaction member during each revolution of said crank including a rocking member, a gear ring to which said rocking member is fulcrumed, means for controlling rotation of said gear ring, a drive connection from said driven shaft to said rocking member for rocking said rocking member and an operative connection from the opposite end of said rocking member to said reaction member.

11. In a reciprocating drive mechanism of the class described, a drive shaft, a driven shaft having a crank thereon, planetary drive gearing for rotating said shaft with a variable angular velocity during each revolution thereof including a reaction member, means driven at a variable angular velocity for varying the angular velocity of said crank comprising means for reciprocably moving said reaction member during each revolution of said crank including a rocking member, a gear ring to which said rocking member is fulcrumed, means for selectively holding said gear ring from movement, a drive connection from said driven shaft to said rocking member for rocking said rocking member, an operative connection from the opposite end of said rocking member to said reaction member, and means for rotating said gear ring for shifting the fulcrum point of said rocking member in such a manner as to reverse the order of acceleration and deceleration of said driven crank.

12. In a reciprocating drive mechanism of the class described, a drive shaft, a driven shaft having a crank thereon, planetary drive gearing for rotating said shaft with a variable angular velocity during each revolution thereof including a reaction member, means driven at a variable angular velocity for varying the angular velocity of said crank comprising means for reciprocably moving said reaction member during each revolution of said crank including an oscillating member encircling said drive shaft, a drive connection from said shaft to said member for oscillating said member, and a rocking member fulcrumed at one of its ends, having a sliding pivotal connection with said oscillating member intermediate its ends and having operative connection with said reaction member adjacent its opposite end.

13. In a reciprocating drive mechanism of the class described, a drive shaft, a driven shaft having a crank thereon, planetary drive gearing for rotating said shaft with a variable angular velocity during each revolution thereof including a reaction member, means driven at a variable angular velocity for varying the angular velocity of said crank comprising means for reciprocably moving said reaction member during each revolution of said crank including an oscillating member encircling said drive shaft, a drive connection from said shaft to said frame for oscillating said member, a rocking member fulcrumed at one of its ends and having operative connection with said reaction member at its opposite end, said oscillating member having an annular guide therein, a member slidably movable in said guide and an operative connection from said member to said rocking member.

14. An apparatus in accordance with claim 13, wherein means are provided for adjusting the fulcrum of the rocking member in an arc coaxial with the axis of the reaction member in such a manner as to reverse the order of acceleration and deceleration of the driven crank.

15. In an apparatus of the class described, a driving shaft, a driven shaft having a crank thereon, drive gearing for rotating said crank with a predetermined variable angular velocity during each revolution thereof including an orbitally movable pinion, a reaction member movable in opposite directions during each revolution of said crank meshed with said pinion, and means for reciprocably moving said reaction member in timed relation with said crank including an oscillating member encircling said driven shaft, a connection from said crank to said oscillating member, a rocking member fulcrumed adjacent one of its ends and operatively connected with said reaction member at its opposite end, and a slidable pivotal connection between said oscillating member and rocking member.

16. In an apparatus of the class described, a driving shaft, a driven shaft having a crank thereon, drive gearing for rotating said crank with a predetermined variable angular velocity during each revolution thereof including an orbitally movable pinion, a reaction member movable in opposite directions during each revolution of said crank meshed with said pinion, and means for reciprocably moving said reaction member in timed relation with said crank including an oscillating member encircling said driven shaft, another crank on said shaft, a connection from said crank to said oscillating member, a rocking member fulcrumed adjacent one of its ends and operatively connected with said reaction member at its opposite end, an annular guide formed in said oscillating member, a member slidable in said guide, and a pivotal connection from said member to said rocking member.

17. An apparatus in accordance with claim 16, wherein means are provided for adjusting the fulcrum of the rocking member in an arc coaxial with the axis of rotation of the reaction member in such a manner as to reverse the order of acceleration and deceleration of the driven crank.

18. An apparatus in accordance with claim 16, wherein means are provided for adjusting the fulcrum of the rocking member in an arc coaxial with the axis of rotation of the reaction member in such a manner as to reverse the order of acceleration and deceleration of the driven crank, and wherein said means comprise a rotatable member to which said rocking member is fulcrumed and means for rotating and controlling rotation of said rotatable member.

19. In a shaker conveyer drive, a reciprocably driven member including a conveyer trough, a rotatable crank, a connection between said crank and reciprocably driven member, means for rotating said crank in such a manner that its maximum acceleration is in the latter portion of the forward stroke of said reciprocably driven member comprising a planetary geared reduction device including a reciprocably movable reaction member comprising an internal gear, means for moving said internal gear in opposite directions during each revolution of said crank including a crank driven by the means for rotating said last-mentioned crank and a rocking arm rocked by said crank and connected with said internal gear, and means for shifting the point of maximum acceleration of said reciprocably driven member from the latter portion of the forward stroke to the central portion of the forward stroke for gradually diminishing the conveying action of said conveyer trough and thence to the first portion of the first half of the forward stroke for reversing the conveying action of said conveyer trough comprising means for shifting the axis of pivotal movement of said rocking arm including a rotatable member to which said rocking arm is pivotally connected and means for rotating said rotatable member or holding said rotatable member from movement.

20. In a shaker conveyer drive, a reciprocably driven member including a conveyer trough, a rotatable crank, a drive connection between said crank and reciprocatory driven member, means for rotating said crank at a variable acceleration in such a manner that its maximum acceleration may occur in the latter portion of the forward stroke of said reciprocably driven member, means for shifting the point of maximum acceleration of said crank from the latter portion of the forward stroke of said reciprocably driven member to the central portion of the forward stroke thereof for gradually diminishing the conveying action of said conveyer trough and thence to the first half of the forward stroke of said reciprocably driven member for reversing the conveying action of said trough comprising a planetary geared reduction device including an internal gear movable in opposite directions during each revolution of said crank, and means for moving and controlling movement of said internal gear including another crank, a member rocked thereby about a fixed pivotal axis, a rocking arm, an operative connection between said rocking arm and internal gear, and a connection between said rocking arm and rocking member permitting movement of said rocking arm with respect to said rocking member for varying the length of stroke of said rocking arm.

21. In a shaker conveyer drive, a reciprocably driven member including a conveyer trough, a rotatable crank, a connection between said crank and reciprocably driven member, means for rotating said crank in such a manner that its maximum acceleration may occur in the latter portion of the forward stroke of said reciprocably driven member, means for shifting the point of maximum acceleration of said crank from the latter portion of the forward stroke of said reciprocably driven member to the central portion of the forward stroke thereof for gradually diminishing the conveying action of said conveyer trough and thence to the first half of the forward stroke of said reciprocably driven member for reversing the conveying action of said trough comprising a planetary geared reduction device including an internal gear movable in opposite directions during each revolution of said crank, and means for moving and controlling movement of said internal gear including another crank, a member rocked thereby about a fixed pivotal axis, a rocking arm, an operative connection between said rocking arm and internal gear, means for pivotally moving the axis of pivotal movement of said rocking arm in an arc whose radius is coaxial with the axis of pivotal movement of said internal gear, and a slidable connection between said rocking member and rocking arm permitting movement of the pivotal axis of said rocking arm for varying the arc of movement of said rocking arm.

22. A shaker conveyer in accordance with claim 21, wherein the slidable connection between the rocking member and rocking arm comprises an annular guide formed in said rocking member, a member slidably movable therein and a pivotal connection between said member and rocking arm.

WILLIAM W. SLOANE.